United States Patent [19]

Miyata et al.

[11] Patent Number: 4,856,019
[45] Date of Patent: Aug. 8, 1989

[54] REFLECTOR FOR EXCIMER LASER AND EXCIMER LASER APPARATUS USING THE REFLECTOR

[75] Inventors: Takeo Miyata, Zama; Takashi Iwabuchi, Sagamihara, both of Japan

[73] Assignee: Matsushita Electric Industrial Co., Ltd., Kadoma, Japan

[21] Appl. No.: 160,460

[22] Filed: Feb. 25, 1988

[30] Foreign Application Priority Data

Feb. 26, 1987 [JP] Japan .................................. 62-43328

[51] Int. Cl.⁴ ............................................. H01S 3/08
[52] U.S. Cl. ........................................ 372/99; 372/57; 350/164
[58] Field of Search ........................ 372/99, 19, 96, 23, 372/34, 36, 57; 350/164, 600

[56] References Cited

U.S. PATENT DOCUMENTS

| 4,023,119 | 5/1977 | Danielewicz, Jr. | 372/108 |
| 4,132,959 | 1/1979 | Bouwhuis et al. | 372/108 |
| 4,147,409 | 4/1979 | Apfel | 372/99 |
| 4,189,205 | 2/1980 | Vandehei | 350/164 |
| 4,615,033 | 9/1986 | Nakano et al. | 372/108 |
| 4,686,684 | 8/1987 | Dalton et al. | 372/99 |
| 4,710,426 | 12/1987 | Stephens | 350/164 |
| 4,713,824 | 12/1987 | Heller | 372/99 |
| 4,729,633 | 3/1988 | Miyagawa | 372/103 |
| 4,746,202 | 5/1988 | Perilloux et al. | 350/164 |

FOREIGN PATENT DOCUMENTS

| 0195205 | 11/1984 | Japan | 350/164 |
| 0185986 | 8/1986 | Japan | 372/99 |
| 1125589 | 11/1984 | U.S.S.R. | 350/164 |

OTHER PUBLICATIONS

Gill, D. H. et al.: "Use of Non-Quarter-Wave Designs to Increase the Damage Resistance of Reflectors at 532 and 1064 Nanometers", pp. 260-270, Laser Induced Damage in Optical Materials: 1977, issued Dec. 1977.

Primary Examiner—William L. Sikes
Assistant Examiner—Xuan Thi Vo
Attorney, Agent, or Firm—Cushman, Darby & Cushman

[57] ABSTRACT

A reflector for an excimer laser is composed of an aluminum layer deposited on a substrate and at least two pairs of dielectric multilayers of high refractive index material and low refractive index material alternately piled on the aluminum layer, and optical thickness of the respective layers of an outer pair of the dielectric multilayers are deviated from λ/4 and total optical thickness of the outer pair is made to be λ/2.

12 Claims, 8 Drawing Sheets

REFLECTOR FOR EXCIMER LASER AND EXCIMER LASER APPARATUS USING THE REFLECTOR

FIELD OF THE INVENTION

The present invention relates to a reflector which is applicable to an excimer laser, and, more particularly, to a reflector having high reflectance in a wide wavelength range and high damage resistance against the excimer laser light in the ultraviolet range and an excimer laser apparatus using the reflector.

DESCRIPTION OF THE RELATED ART

An excimer laser radiates ultraviolet light and is expected to be applied to semiconductor fabricating processes, the chemical industry, medicine, and the energy generating field.

In a discharge excitation laser, excimer is generated by a high speed pulse discharge which is uniform in spatial distribution in a high pressure laser gas (2-6 atmospheric pressure).

Two kinds of structures are known as a total reflector for the excimer laser in the prior art. A first structure is, as shown in FIG. 1, an aluminum (Al) metal layer 12 having a high reflectance deposited on a substrate 21 such as glass, quartz or fluorite (such as $CaF_2$). Then, the metal layer 12 is covered by a single layer (generally of optical thickness $nd = \lambda/2$) of magnesium fluoride ($MgF_2$) to provide a protection layer 23 to protect the aluminum layer 12 from the excimer laser gas, which is a highly corrosive gas. Since the total reflector is free from wavelength dependency in reflectance, it is usable in excimer lasers using laser gases such as ArF (193 nm), KrF (248 nm) or KeCl (308 nm). However, the reflector is inferior in reflectance, which is under 90%, and, further, has inferior damage resistance, too. Moreover, in the case where the total reflector is used in an application in which it is directly exposed to the excimer laser gas, the corrosion resistance to the gas of the magnesium fluoride layer of $\lambda/2$ optical thickness is insufficient. On the other hand, if the optical thickness of the deposition layers of the magnesium fluoride is increased by integer multiples of $\lambda/2$ in order to improve corrosion resistance to the gas, absorption of the excimer laser light in the deposited layers increases and causes both the damage resistance and the reflectance to decrease. The reflectance with respect to the wavelength of the total reflector is shown by a curve 41 in FIG. 2.

The second total reflector structure is defined, as shown in FIG. 3, by dielectric multilayers 31 formed on a substrate 21 of glass, quartz or fluorite. The dielectric multilayers 31 are composed of alternately stacked layers of plural pairs of two kinds of layers of dielectric materials having a low refractive index and a high refractive index, both having a $\lambda/4$ optical thickness (nd). The reflectance with respect to the wavelength of the above-mentioned total reflector is, as shown by curves 42, 43, and 44 of FIG. 2, high in the particular wavelengths of the excimer laser. In other words, the wavelength dependency is very narrow, and the reflectance is low in other wavelengths of the excimer laser. Therefore, the reflector must be undesirably changed for other reflectors prepared exclusively therefor when the oscillation wavelength is changed by a change of the laser gas in laser cavity. In the dielectric multilayer, the more the number of layers increase, the higher the reflectance becomes in theoretical consideration, but improvement of the reflectance is limited because of absorption and scattering in the various layers and the increase in the mechanical stress in the actual dielectric multilayers.

Besides, in general, unexpected impurities are liable to be included in the boundaries of the layers during the layer forming process. It seems that a high electric field induced by light concentrates to the impurities and local heating is generated in the region of the impurities and the layers are damaged. A distribution of standing wave electric field intensity which is obtained by calculation in the multilayers of each $\lambda/4$ optical thickness in the prior art is shown in FIG. 4. As shown in FIG. 4, a part "A" having a high electric field intensity of the standing wave is positioned at an interface of the layers including many impurities, and it is thought to be one of the causes of the decrease in the damage resistance.

The above-mentioned two kinds of total reflector for the excimer laser in the prior art have both merits and demerits. As a common problem, they are inferior in damage resistance, and the usable power level is only 100 W at the most.

In the case where the output of the laser is as high as 1 KW, which is 10 times the output in the prior art, the problem of heat, which is generated on the surface of the total reflector, must be solved. The amount of heat which is generated on the surface of the total reflector of 98% in reflectance is estimated at 20 W (1 KW $\times$ 2% = 20 W). The temperature at a portion impinged by the laser beam rises in the substrate, which is low in thermal conductivity, such as conventional glass or quartz, and deformation of the total reflector and damage of the reflecting layer are inescapable. An improvement in the damage resistance, therefore, selection of the material for the substrate of the total reflector is considered.

Though the aluminum deposited layer has a wide reflection wavelength range, it has low reflectance. On the other hand, the dielectric multilayer can provide higher reflectance than that of the aluminum layer as an advantage, but it has a disadvantage of narrowness in its reflection wavelength range. Moreover, in order to improve the reflectance, the number of the layers must be increased, however, there is a problem that absorption increases and damage resistance decreases in proportion to the increase in the number of the layers. Furthermore, in a layer structure of the optical thickness of $\lambda/4$, since the interface of the layers is inevitably positioned at a portion where the electric field is high in intensity, the damage resistance is diminished. Then, in order to improve the damage resistance in the layer having a high reflectance, the reflection layer structure, the dielectric material for the multilayer structure, and the thickness of the layer must be considered.

Corrosion by halogen gas contained in the laser gas is unavoidable in either the case of an aluminum reflector surface or the dielectric multilayer surface. In order to solve the above-mentioned problem in the conventional method, a protection layer of magnesium fluoride ($MgF_2$) having a thickness of $\lambda/2$ is deposited on the reflecting surface; however, the forming of a thin protective magnesium fluoride layer having a $\lambda/2$ optical thickness that is free of defects, such as pinholes, is very difficult if not impossible. For example, where the wavelength $\lambda$ is 0.3 $\mu$m and the refractive index n is 1.5, the protective layer is quite thin, i.e., 0.1 $\mu$m (1000 angstroms). Therefore, it is not a complete solution of the problem.

OBJECT AND SUMMARY OF THE INVENTION

An object of the present invention is to provide a total reflector which is utilized for a high power excimer laser, such as a power level of 1 KW, having a high reflectance in a wide range of the reflecting wavelength and having a high damage resistance in excimer laser applications.

The reflector for excimer laser in accordance with the present invention comprises:

a substrate for forming reflecting materials on a surface thereof, an aluminum layer formed on the substrate, and dielectric multilayers formed on the aluminum layers.

DESCRIPTION OF THE PREFERRED EMBODIMENTS

Figure 1:
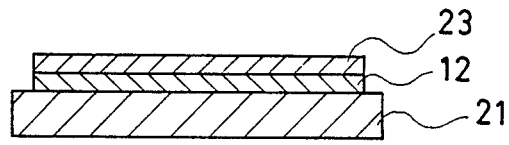
FIG. 1 is a cross-sectional view of a total reflector for excimer lasers of the prior art.
Figure 2:
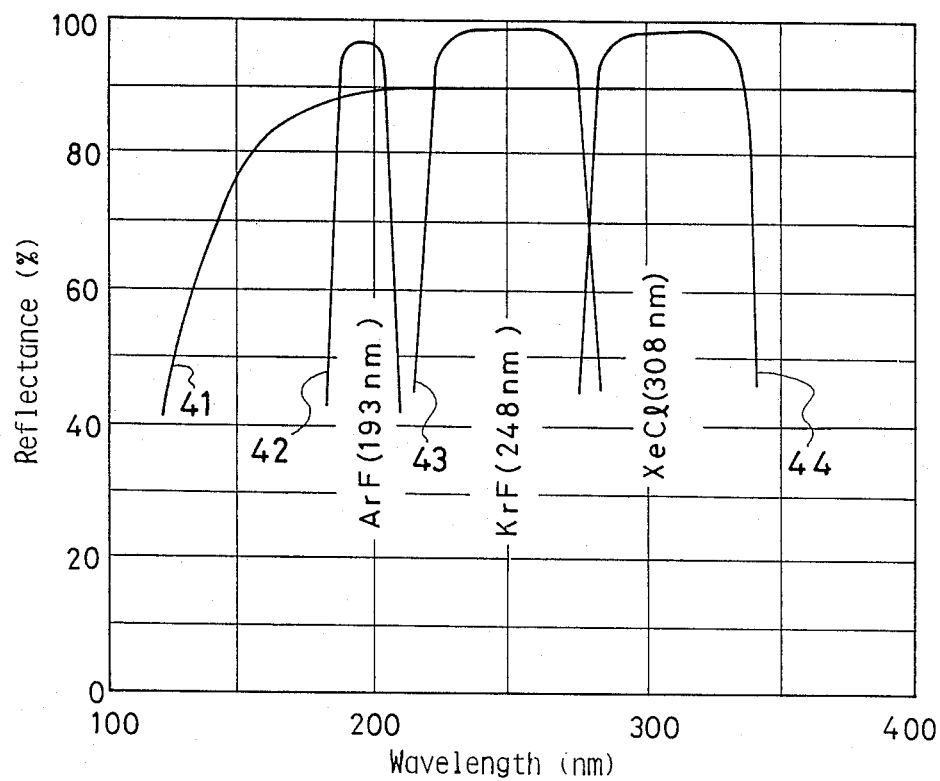
FIG. 2 is the graph showing the reflectance with respect to the wavelength of total reflectors of the prior art.
Figure 3:
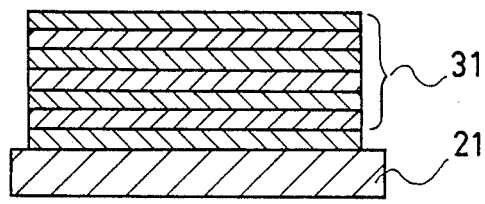
FIG. 3 is the cross-sectional view of another example of total reflector for excimer lasers in the prior art.
Figure 4:
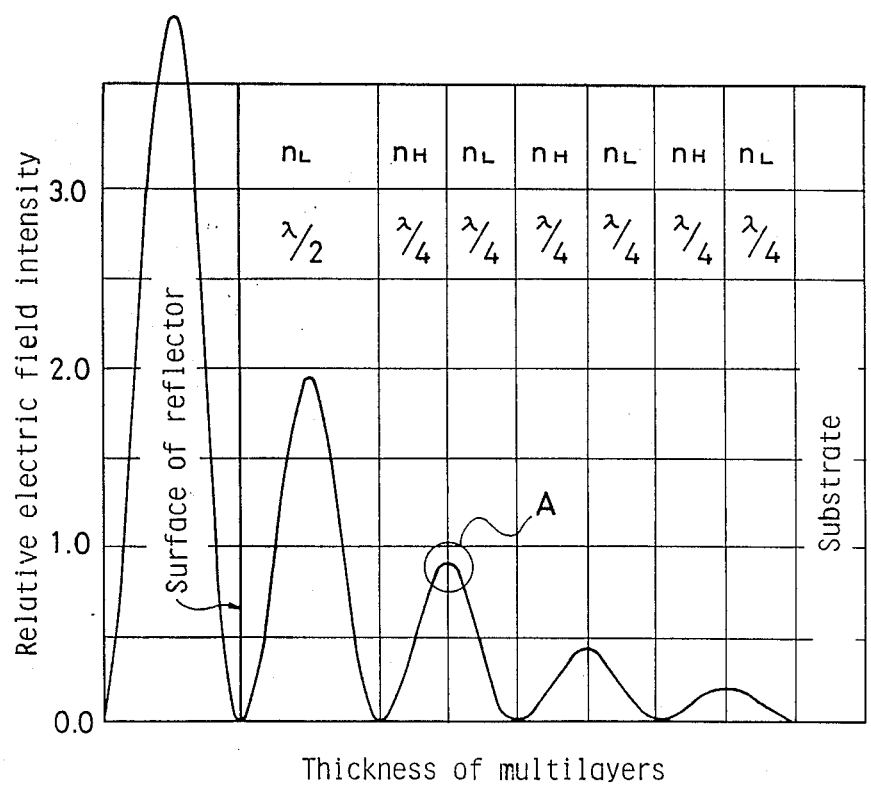
FIG. 4 is the graph showing the distribution of the electric field in the layers of the total reflector in the prior art.
Figure 5:
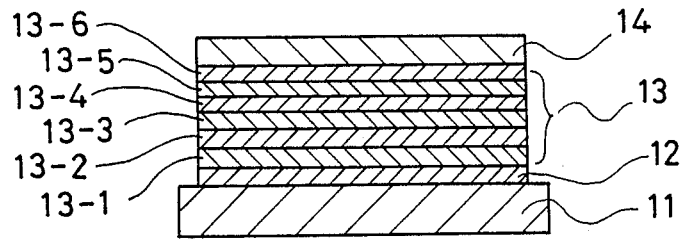
FIG. 5 is a cross-sectional view of a total reflector of a first embodiment of the present invention.

FIG. 5 is a cross-sectional view of a total reflector of a first embodiment of the present invention. As shown in FIG. 5, a surface of a silicon substrate 11 is precisely polished. An aluminum layer 12 having a thickness of about 1000 Å is formed on the silicon substrate 11 by a vacuum evaporation method such as vacuum evaporation by resistance heating, an ion beam evaporation method, or a sputtering method. A plurality of dielectric multilayers 13 are formed on the aluminum layer 12. The dielectric multilayers are composed of alternative layers of magnesium fluoride ($MgF_2$) as a low refractive index material and scandium oxide ($Sc_2O_3$) as high refractive index material. In the embodiment, three pairs of both the materials are formed by the vacuum evaporation method. The first layer 13-1, third layer 13-3, and fifth layer 13-5 of the dielectric multilayers are the magnesium fluoride layers, and the second layer 13-2, fourth layer 13-4 and sixth layer 13-6 are scandium oxide layers. An optical thickness (nd) of the first layer 13-1 and the third layer 13-3 are $\lambda/4$, and a geometrical thickness (d) is about 43.79 nm.

Namely, in the case that a central wavelength $\lambda$ of the laser light is 250.5 nm and the refractive index (n) is 1.43, the geometrical thickness (d) 43.79 nm is obtained by substituting the above-mentioned values of $\lambda$ and n into a known equation $d = 1/n \, (\lambda/4)$.

The optical thickness of the scandium oxide layers of the second layer 13-2 and fourth layer 13-4 are ($\lambda/4$), and the geometrical thickness (d) thereof is about 29.68 nm ($\lambda = 250.5$ nm, $n = 2.11$).

The optical thickness (nd) of the magnesium fluoride layer of the fifth layer 13-5 is $3\lambda/8$, and the geometrical thickness (d) is about 65.69 nm. The optical thickness (nd) of the scandium oxide layer of the sixth layer 13-6 is $\lambda/8$, and the geometric thickness (d) is about 14.84 nm.

Features of the layer structure are that the respective optical thicknesses of the magnesium fluoride layer of the fifth layer 13-5 and the scandium oxide layer of the sixth layer 13-6 are made to deviate from $\lambda/4$, and a total optical thickness of both the layers is made to be $\lambda/2$ ($3\lambda/8 + \lambda/8 = \lambda/2$).

A single crystal polished protection plate 14 of fluorite ($CaF_2$) is about 1 mm thickness and is transparent (having high purity and negligible absorption) in the wavelength range of the embodiment.

The reflecting layers 12 and 13 are heated by impingement of the laser light. The heat generated on the reflecting layers 12 and 13 causes deformation of the substrate 11 and damage to the reflecting layers. Therefore, it is desirable that the material of the substrate 11 have a high thermal conductivity (K) and a low coefficient of linear expansion ($\alpha$). Figure of merit $K/\alpha$ is defined in order to estimate the desired characteristic of the material of the substrate 11. Referring to the figure of merit $K/\alpha$, a material having high figure of merit $K/\alpha$ is feasible for the substrate 11.

Table 1 shows physical properties of several kinds of substrate materials.

TABLE I

| Substrate | Physical properties of substrate materials | | | | |
|---|---|---|---|---|---|
| | Usable temperature (°C.) | Thermal conductivity K (W/cm · °C.) | Coefficient of linear expansion $\alpha$ ($10^{-6}$/°C.) | Figure of merit $K/\alpha$ ($10^6$ · W/cm) | Ratio of $K/\alpha$ of the material to $K/\alpha$ of BK-7 glass |
| Glass (BE-7) | <550 | 0.011 | 7.1 | 0.0015 | 1 |
| Low expansion glass (ZERODUR) | <600 | 0.016 | 0.05 | 0.32 | 206 |
| Fused quartz | <1000 | 0.014 | 0.6 | 0.023 | 15 |
| Silicon (Si) | <1400 | 1.38 | 2.5 | 0.552 | 356 |
| Silicon Carbide | | | | | |

TABLE I-continued

| | Physical properties of substrate materials | | | | |
|---|---|---|---|---|---|
| Substrate | Usable temperature (°C.) | Thermal conductivity K (W/cm · °C.) | Coefficient of linear expansion $\alpha$ $(10^{-6}/°C.)$ | Figure of merit K/$\alpha$ $(10^6 \cdot$ W/cm) | Ratio of K/$\alpha$ of the material to K/$\alpha$ of BK-7 glass |
| (SiC) | <1650 | 1.8 | 4.3 | 0.42 | 271 |
| Tungsten (W) | <3000 | 1.67 | 4.5 | 0.37 | 239 |

As shown in Table 1, silicon (Si), silicon carbide (SiC), and tungsten (W) have several hundred times the thermal conductivity of certain kinds of glass used in the prior art and are almost equal to metal in their thermal conductivity. Moreover, silicon, silicon carbide, and tungsten are superior than other kinds of glasses in terms of their figure of merit (K/$\alpha$). Namely, the figure of merit (K/$\alpha$ of silicon is $0.522 \times 10^6$ (W/cm), that of silicon carbide is $0.419 \times 10^6$ (W/cm) and that of tungsten is $0.371 \times 10^6$ (W/cm) as shown in Table 1. Thus, the substrate having the figure of merit (K/$\alpha$) being more than $0.37 \times 10^6$ (W/cm) is feasible for the substrate.

Figure 6:
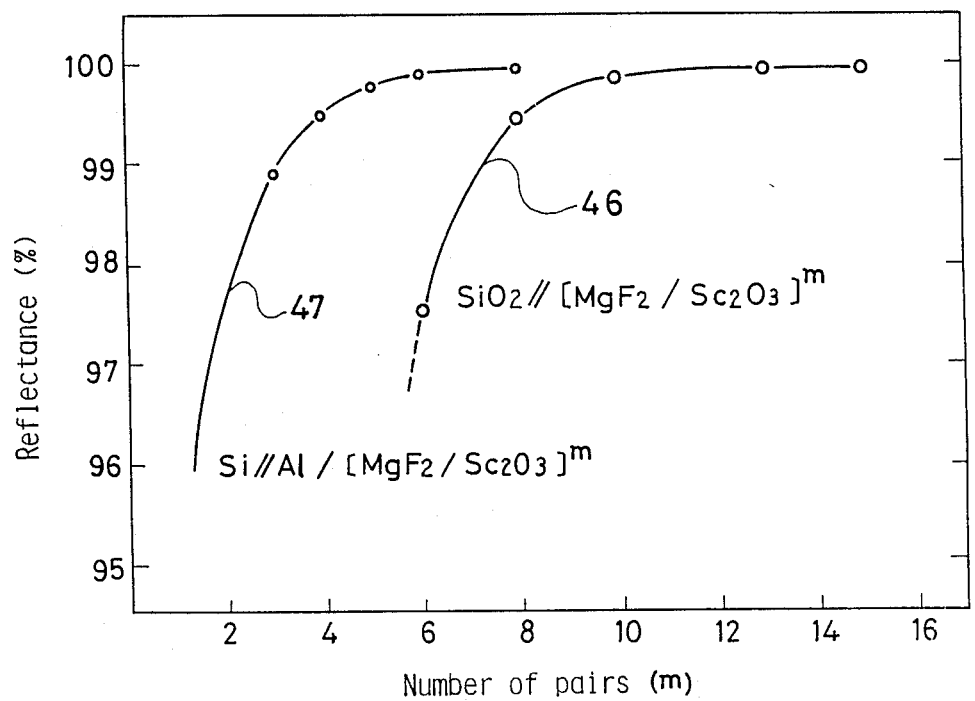
FIG. 6 is a graph showing reflectance with respect to a number of pairs in the embodiment of FIG. 5 and the prior art.

An effect of high reflectance dielectric multilayers 13 which are formed on the aluminum deposited layer 12 is elucidated hereinafter. A curve 46 in FIG. 6 shows a reflectance dependency with respect to a number of pairs of the magnesium fluoride layer and scandium oxide layer which are formed on a quartz substrate and have $\lambda/4$ optical thickness, and a curve 47 shows a reflectance dependency with respect to a number of pairs of the magnesium fluoride layer and scandium oxide layer which are formed on the aluminum layer on the silicon substrate. At least seven pairs of the magnesium fluoride layer and scandium oxide layer are necessary to achieve over 99% of the reflectance when using the conventional quartz substrate, while substantially the same reflectance can be effectuated by only three pairs of the magnesium fluoride layer and scandium oxide layer formed on the aluminum layer deposited on the silicon substrate in the present invention, as shown by curves 46 and 47. Absorption, dispersion and mechanical stress in the multilayers increase in proportion to increased layers, and cause a decrease in the damage resistance by irradiation of the laser light. In the first embodiment, since the number of layers is half of that of the conventional reflector, the deposition process of the layers is simplified and high quality layers having high damage resistance are obtainable.

Figure 7:
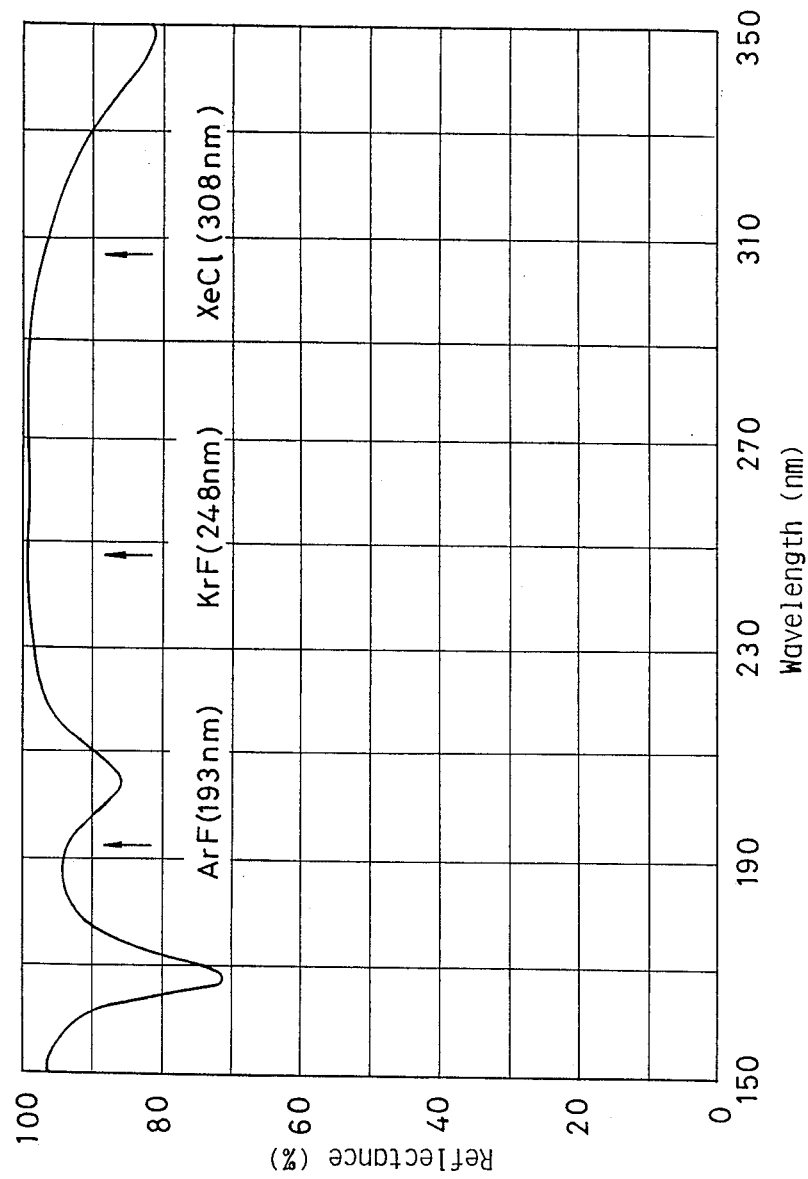
FIG. 7 is a graph showing a reflectance with respect to a wavelength of the total reflector in the embodiment of FIG. 5.

Effects of the multilayer structure of the embodiment are elucidated hereinafter. Calculated reflectance with respect to the wavelength is shown in FIG. 7. As shown in the curve of FIG. 7, a reflectance of over 90% is achieved in the respective wavelengths of the laser light for the ArF laser (193 nm), KrF laser (248 nm) and XeCl laser (308 nm), and a reflector operable over a wide wavelength range is obtainable.

Figure 8:
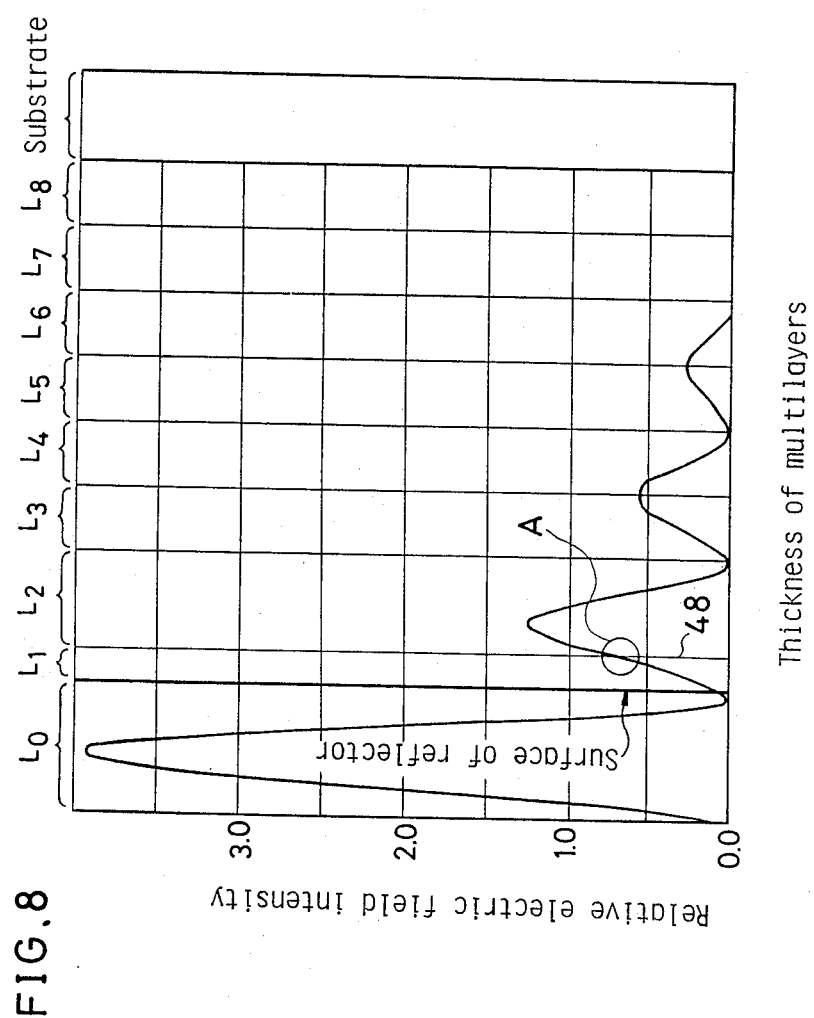
FIG. 8 is a graph showing distribution of an electric field intensity in the layers of the embodiment of FIG. 5.

FIG. 8 is a graph showing a distribution of the electric field intensity in the layers of the embodiment which is obtained through calculation. As shown by the graph, an interface 48 is positioned at a comparatively low electric field portion as shown by a circle A by deviating the optical thickness of the outer pair of layers from $\lambda/4$. Consequently the damage resistance is improved.

In the case where the optical thickness of the respective layers of the outer pair is changed from $\lambda/4$, only making the total optical thickness of the pair to be $\lambda/2$ does not always give desirable results for in any combination of the optical thickness of the respective layers. Several examples of the combination of the optical thickness of the respective layers of the outer pair are shown in Table 2, in which the values of calculated reflectance of the respective examples are listed.

TABLE 2

| | Reflectance in combination of optical thickness of outer pair of two layers | | | | | |
|---|---|---|---|---|---|---|
| Example | Optical thickness of outer pair of layers | | Reflectance in respective wavelengthes R (%) | | | Judgement R > 90% in all wavelength |
| | $MgF_2$ (x) | $Sc_2O_3$ (y) | 193 nm | 248 nm | 308 nm | |
| 1 | $\lambda/4$ | $\lambda/4$ | 85.2 | 99.2 | 95.4 | X |
| 2 | $5\lambda/16$ | $3\lambda/16$ | 91.6 | 99.2 | 96.4 | O |
| 3 | $3\lambda/8$ | $\lambda/8$ | 92.6 | 98.9 | 96.1 | ⊚ |
| 4 | $7\lambda/16$ | $\lambda/16$ | 91.3 | 98.5 | 95.5 | O |
| 5 | $\lambda/8$ | $3\lambda/8$ | 86.3 | 99.9 | 91.4 | X |

Layer structure; Al//$[MgF_2(\lambda/4)/Sc_2O_3(\lambda/4)]^2MgF_2$ (x)/$Sc_2O_3$(y)
Refractive index; $MgF_2$; n = 1.43, $Sc_2O_3$; n = 2.11
Center wavelength; $\lambda$ = 260.5 nm
⊚: Very good
O: Fair
X: Bad In the Example 1 of Table 2, the optical thickness of both the layers of the outer pair is $\lambda/4$, and the reflectance (R) is below 90% in the wavelength of 193 nm. The desirable characteristic is not obtainable, because the reflectance of 90% is used as the criterion of the characteristic of the reflector in the embodiment. Therefore, in the column labelled 'Judgement' of Table 2, a cross as being infeasible is marked. In the Examples 2, 3 and 4, the optical thickness of the magnesium fluoride layers are thicker than that of the scandium oxide layer, and the reflectance (R) exceeds 90% in any wavelength. Therefore, a circle as being feasible or a double circle as being most feasible is marked in the "Judgement" column. In the Example 5, the optical thickness of the scandium oxide layer is thicker than that of the magnesium fluoride layer, and the reflectance is below 90% for the wavelength of 193 nm. Consequently, the layer structure is infeasible in the embodiment as marked by a cross.

An effect of the single crystal polished plate 14 of calcium fluoride (CaF$_2$) is elucidated hereinafter. In case that the total reflector is exposed to the excimer laser gas in the resonance chamber, the calcium fluoride plate 14 is effective to protect the aluminum layer 12 and dielectric multilayer 13 from corrosion by the laser gas.

According to the embodiment as mentioned above, since silicon which is superior in thermal characteristic is used as a substrate 11 and the reflecting layer is composed of combination of the aluminum layer 12 and the dielectric multilayers 13, the number of the layers, which is a cause of the decrease in the damage resistance, can be reduced. Moreover, the range of wavelength with respect to a predetermined reflectance can be expanded by deviation of the optical thickness of the respective layers in the outer pair of the dielectric multilayers from $\lambda/4$. As a result, the interface of the dielectric layers in the outer pair is positioned in the portion of low electric field intensity, and the wide band total reflector having high reflectance and high damage resistance is realized. Where further corrosion resistance to the excimer laser gas is required, the calcium fluoride plate 14, for example, is mounted on the total reflector, and thereby, the circumferential resistance is improved.

In a second embodiment of the present invention, the substrate 11 is made of silicon carbide instead of silicon of the first embodiment. The magnesium fluoride as low refractive index material in the first embodiment is replaced here, by lithium fluoride (LiF), and scandium oxide as high refractive index material is replaced by aluminum oxide (Al$_2$O$_3$). Further, a magnesium fluoride plate is used instead of the calcium fluoride plate for the protection plate 14. The layer structure is shown by the following representation:

Al//[LiF($\lambda/4$)Al$_2$O$_3$($\lambda/4$)]$^2$LiF($3\lambda/8$)/Al$_2$O$_3$($\lambda/8$).

In the case where the center wavelength is 250.5 nm, the refractive index (n) of lithium fluoride is 1.37 and the refractive index (n) of aluminum oxide is 1.72. Then, the geometrical thickness d of a lithium fluoride layer of $\lambda/4$ optical thickness is about 45.7 nm, and the geometrical thickness d of aluminum oxide layer of $\lambda/4$ optical thickness is about 36.4 nm, the geometrical thickness d of lithium fluoride layer of $3\lambda/8$ optical thickness is about 68.6 nm and the optical thickness d of aluminum oxide of $\lambda/8$ optical thickness is about 18.2 nm.

Figure 9:
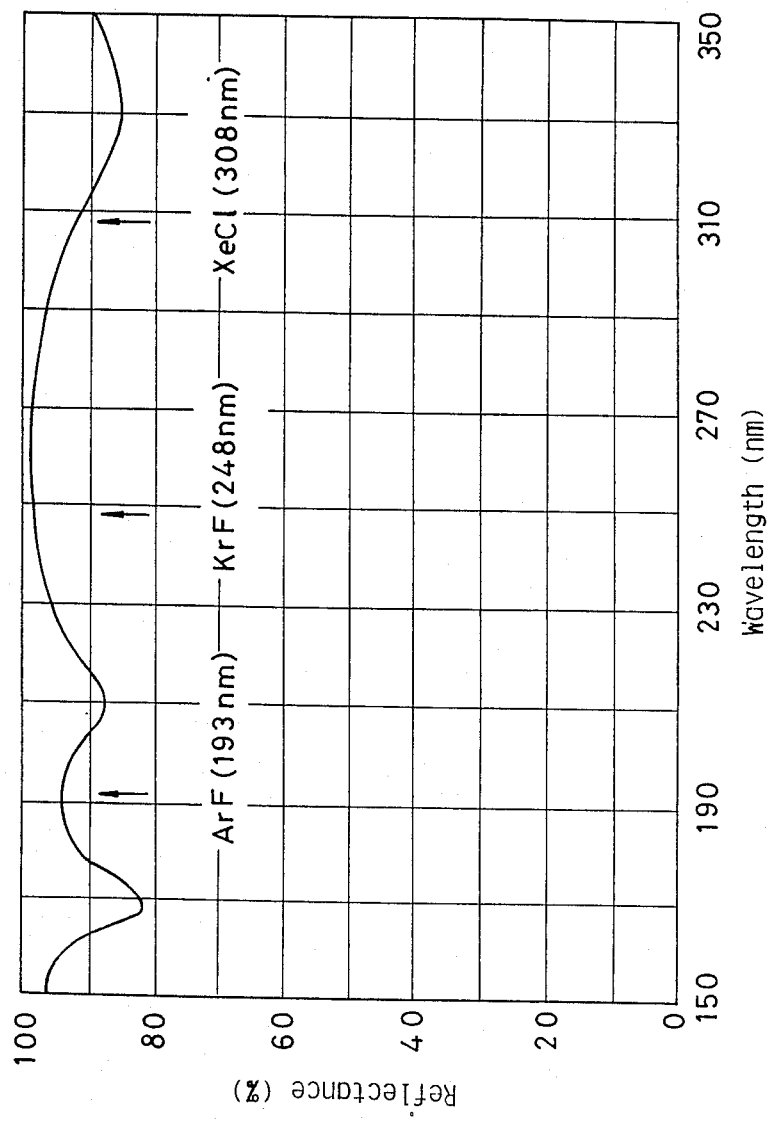
FIG. 9 is a graph showing a reflectance with respect to the wavelength of the total reflector in a second embodiment of the present invention.

Reflectance with respect to wavelength in the second embodiment is shown by a curve in FIG. 9. As shown, the reflectance exceeding 90% is obtainable in the respective wavelength of the laser lights of ArF laser (193 nm), KrF laser (248 nm) and XaCl laser (308 nm), and a total reflector having wide band width is realized.

In a similar manner to the first embodiment, calculated reflectance for the case where the optical thickness of the respective layers of the outer pair of the dielectric layers is deviated from $\lambda/4$ are shown in Table 3.

As shown in Table 3, the optical thickness of both the layers in the outer pair are all $\lambda/4$ in the Example 1, and reflectance (R) is over 90% in both the wavelength 193 nm and 248 nm. However, in the wavelength of 308 nm, the reflectance is under 90%, and the Example 1 of Table 3 can not pass the criterion.

TABLE 3

| | Reflectance in combination of optical thickness of outer pair of two layers | | | | | |
|---|---|---|---|---|---|---|
| | Optical thickness of outer pair of layers | | Reflectance in respective wavelengthes R (%) | | | Judgement R > 90% in all wavelength |
| Example | LiF (x) | Al$_2$O$_2$ (y) | 193 nm | 248 nm | 308 nm | |
| 1 | $\lambda/4$ | $\lambda/4$ | 90.0 | 99.0 | 88.1 | X |
| 2 | $5\lambda/16$ | $3\lambda/16$ | 91.9 | 97.9 | 89.7 | Δ |
| 3 | $3\lambda/8$ | $\lambda/8$ | 92.3 | 97.5 | 90.6 | ⊚ |
| 4 | $7\lambda/16$ | $\lambda/16$ | 91.1 | 97.1 | 90.8 | O |
| 5 | $\lambda/8$ | $3\lambda/8$ | 88.6 | 97.6 | 85.6 | X |

Layer structure; Al//[LiF($\lambda/4$)/Al$_2$O$_3$($\lambda/4$)]$^2$LiF(x)/Al$_2$O$_3$(y)
Refractive index; LiF; n = 1.37, Al$_2$O$_3$; n = 1.72
Center wavelength; $\lambda$ = 250.5 nm
⊚: Very good
O: Fair
X: Bad In the Examples 2, 3 and 4, the lithium fluoride layer is thicker than the aluminum oxide layer in the optical thickness, and the reflectance is slightly less than 90% in the wavelength 308 nm of the Example 2, but the judgment criterion is satisfied for the most part in the wavelength range. Therefore, a triangle mark is put in the "Judgement" column. On the contrary and in the Example 5, the aluminum oxide layer is thicker than the lithium fluoride layer in the optical thickness, but the reflectance is less than 90% in the wavelength of 193 nm and 308 nm, and the judgment criterion can not be satisfied.

Figure 10:
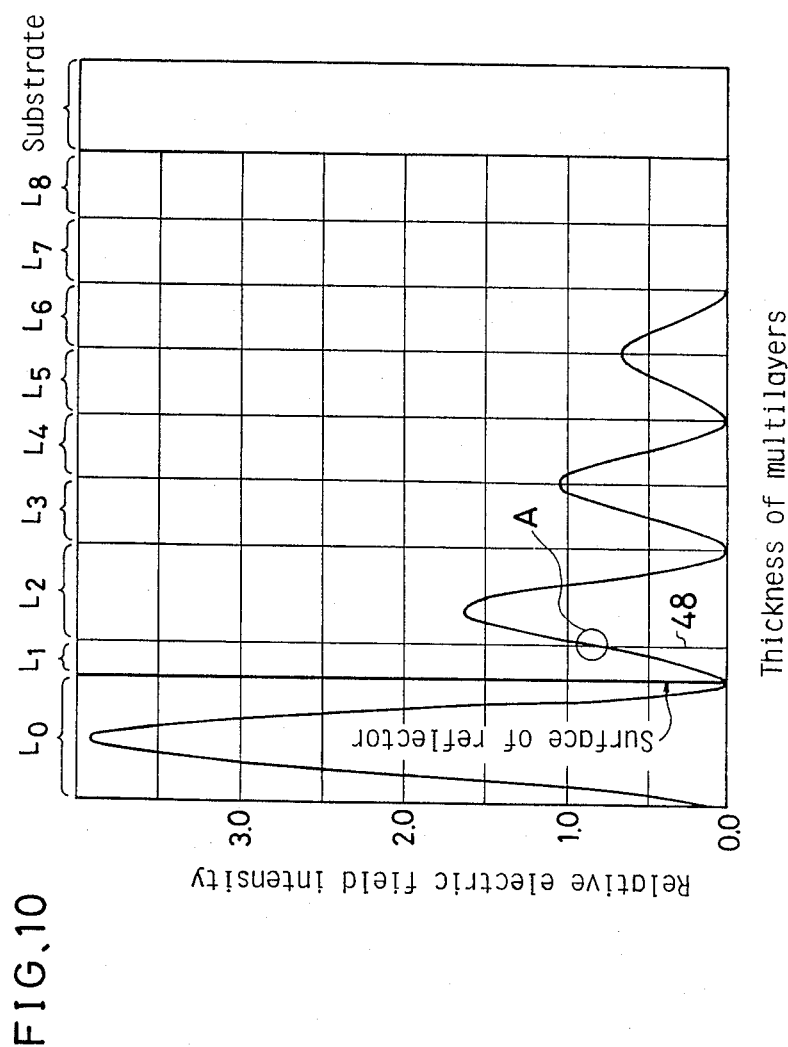
FIG. 10 is a graph showing distribution of the electric field intensity in the layers of the second embodiment of the present invention.

FIG. 10 is a graph showing a distribution of the optical electric field intensity in the layers with respect to the thickness of the multilayers in the second embodiment. Since the optical thickness of both the layers in the outer pair is deviated from $\lambda/4$, the electric field intensity in the interface of both the layers is comparatively low as shown by a circle A in FIG. 10. Consequently, the damage resistance is improved.

As mentioned above, the similar effect to the first embodiment is realized by the embodiment, and a wide band total reflector having high reflectance and high damage resistance is obtainable.

Experiments show that results are obtainable by employing tungsten (W), molybdenum (Mo), tungsten-molybdenum alloy (W-Mo) or thermal resistance ceramics for the substrate. Moreover, a substrate which is coated with silicon carbide (SiC) on the above listed materials is usable in the embodiment. Materials for forming the high reflectance dielectric multilayer can be selected from oxides and fluorides which have little absorption for the laser light in a wavelength range of the excimer laser (for example, oxides such as yttrium oxide (Y$_2$O$_3$), hafnium oxide (HfO$_2$), magnesium oxide (MgO), and silicon oxide (SiO$_2$), and fluoride such as yttrium fluorides (YF$_3$), lanthanum fluoride (LaF$_3$), calcium fluoride (CaF$_2$), and thorium fluoride (ThF$_4$) can be employed.

In the first and second embodiments, the optical thickness of both the layers of the outer pair are made deviate from $\lambda/4$ in order to obtain a wide band characteristic, but in case that a high reflectance and high damage resistance are required in a specific wavelength of the excimer laser, if the optical thickness of both the layers is $\lambda/4$, the high damage resistance is realized by the layer structure in accordance with the present invention.

Though the total reflector of the present invention is shown as a plane mirror in the cross-sectional view of FIG. 5, the present invention is applicable to a spherical mirror and aspherical mirror.

As mentioned above in the total reflector for the excimer laser of the present invention, a heat which is generated on the reflecting plane by irradiation of the laser light is effectively conducted to a heatsink which is mounted on the reflector, since the substrate is made of silicon, silicon carbide, or molybdenum tungsten alloy (Mo-W) which is superior in thermal conductivity. Consequently, local temperature rise in the substrate is prevented and deformation of the substrate by heat and temperature rise of the reflector is also prevented, and thereby the damage resistance is further improved. Moreover, the number of the dielectric multilayers can be reduced by half, and thereby, the reflecting layers are formed by aluminum and dielectric multilayers, and it is effective to improve the damage resistance.

Figure 11:
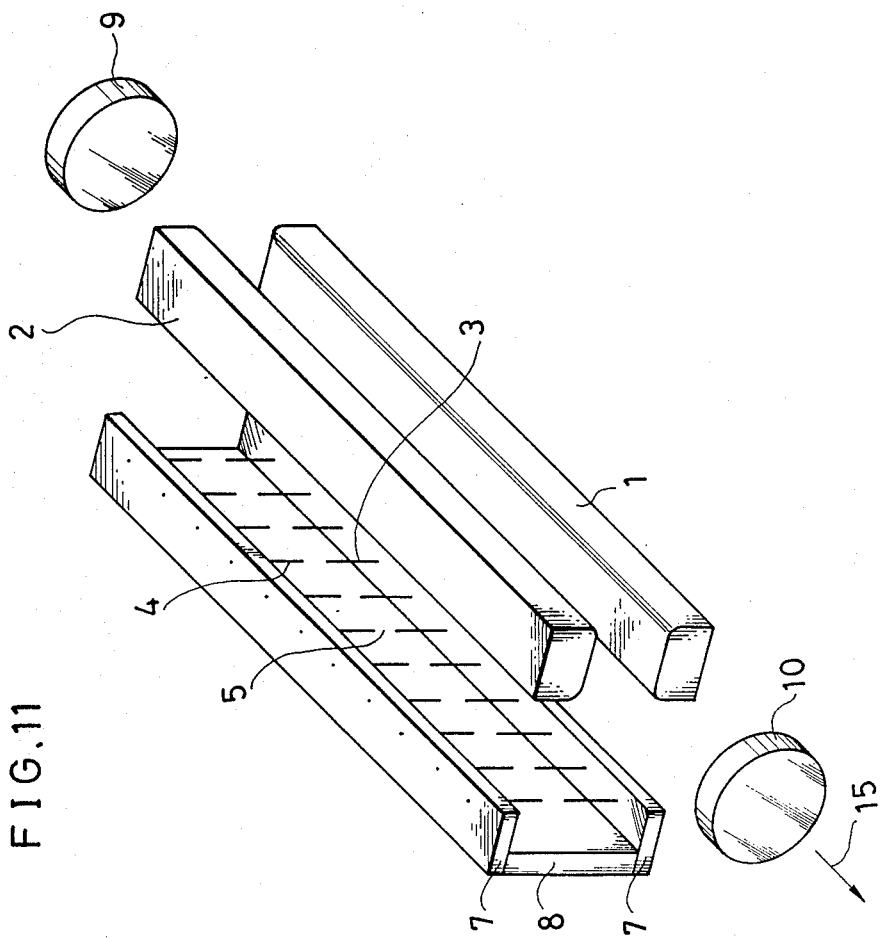
FIG. 11 is a perspective view of an excimer laser apparatus in accordance with the present invention.

An example of an excimer laser apparatus using the total reflector in accordance with the present invention is shown in FIG. 11.

As shown in FIG. 11, two bar-shaped main discharge electrodes 1 and 2 are arranged in a spaced parallel relationship relative one another on opposite sides of a laser beam axis 15. A total reflector 9 is positioned adjacent one end of the main discharge electrodes 1 and 2. An output coupling reflector 10 is placed adjacent to the other end of the main discharge electrodes 1 and 2. Ten pairs of needle-shaped predischarge electrodes 3 and 4 are arranged along the main discharge electrodes 1 and 2, and the predischarge electrodes 3 and 4 are held by two holding members 7 which are connected by an isolation member 8. The respective predischarge electrodes 3 of one of the holding members 7 oppose the respective predischarge electrodes 4 of the other of the holding members 7 so as to maintain a predetermined gap therebetween. The main discharge electrodes 1 and 2, and the predischarge electrodes 3 and 4 are enclosed in an envelope with excimer laser gas. The total reflector 9 and the output coupling reflector 10 are mounted on openings of the envelope.

Operation of the apparatus is elucidated hereinafter. Prior to the opposed main discharge, arc discharge is generated between the predischarge electrodes 3 and 4, and ultraviolet light is emitted between the gap. Then the arc discharge is generated along the length of the main discharge electrodes 1 and 2, and a domain between the main discharge electrodes 1 and 2 is irradiated by a stable and uniformly ultraviolet light of the predischarge, and a lot of uniform ionized electrons are produced by the pre-ionization effect by the predischarge.

In the above-mentioned state, when a glow discharge is generated between the main discharge electrodes 1 and 2, a stable glow discharge is maintained because of existence of a lot of uniformly ionized electrons. Then, a laser beam 15 of ultraviolet light which is stable in output and is uniform in spatial distribution is output.

In order to generate the uniform glow discharge, it is important and essential to ionize the laser gas previously and slightly (pre-ionization) previous to the above-mentioned main discharge. Concerning output of the laser light, stability of the output and a diameter of the laser beam significantly depend on the number and spatial uniformity of the electrons which are produced in the preionization.

In the embodiment, since the total reflector 9 has the high reflectance, a high output beam is obtained. Moreover, since the total reflector 9 has a wide range of wavelength in high reflectance, even if the wavelength of the laser beam is changed by change of the kind of the excimer laser gas, the apparatus is usable without exchange of the total reflector 9.

What is claimed is:

1. A reflector for an excimer laser comprising:
   a substrate made of a material having a high thermal conductivity and a low coefficient of linear expansion,
   an aluminium layer formed on one surface of said substrate, and
   dielectric multilayers formed on said aluminium layer,
   said dielectric multilayers being essentially composed of at least two pairs of a layer of high refractive index material and a layer of low refractive index material, and an optical thickness of each layer except for an outer pair of layers is $\lambda/4$, and an optical thickness of each layer of said outer pair of layers is deviated from $\lambda/4$, and total optical thickness of said outer pair of layers is $\lambda/2$.

2. A reflector for an excimer laser in accordance with claim 1, wherein
   said substrate is made of material which is at least $0.37 \times 10^6 \times$ W/cm in ratio of thermal conductivity to coefficient of linear expansion.

3. A reflector for an excimer laser in accordance with claim 1, wherein
   said substrate is made of a material selected from the group consisting of silicon, silicon carbide, tungsten, molybdenum, an alloy of tungsten and molybdenum, thermal resistance ceramics, tungsten covered with silicon carbide, molybdenum covered with silicon carbide, an alloy of tungsten and molybdenum covered with silicon carbide and thermal resistance ceramics covered with silicon carbide.

4. A reflector for an excimer laser in accordance with claim 1, wherein
   said dielectric multilayers are made of alternative lamination of two kinds of layers selected from the group consisting of yttrium oxide, hafnium oxide, scandium oxide, magnesium oxide, aluminium oxide, silicon oxide, yttrium flouride, lithium flouride, magnesium flouride, lanthanum flouride, calcium flouride and thorium flouride.

5. A reflector for an excimer laser in accordance with claim 1, wherein
   an optical thickness of the layer of low refractive index material is thicker than the optical thickness of the layer of high refractive index material in the outer pair.

6. A reflector for an excimer laser in accordance with claim 1, further comprising:
a protecting plate formed on a surface of the dielectric multilayers.

7. A reflector for an excimer laser in accordance with claim 6, wherein
said protecting plate is made of a single crystal plate of material selected from the group consisting of calcium flouride and magnesium flouride.

8. An excimer laser apparatus comprising:
a pair of longitudinally extending bar-shaped main discharge electrodes enclosed in a chamber in a spaced parallel relationship relative one another and defining a gap therebetween having a longitudinally directed laser axis therein,
a plurality of pre-discharge electrodes in said chamber extending along and adjacent to the gap defined between said pair of main discharge electrodes,
a laser gas including an excimer laser active medium enclosed in said chamber,
a total reflector positioned in proximity to one end of said pair of main discharge electrodes for reflecting energy along the laser axis, said total reflector being composed of an aluminium layer and dielectirc multilayers formed on a substrate made of a material having a high thermal conductivity and a low coefficient of linear expansion, and
an output coupling reflector positioned in proximity to the other end of said pair of main discharge electrodes and facing said first-mentioned end for reflecting energy along the laser axis,
wherein said dielectric multilayers are composed of at least two pairs of a layer of high refractive index material and a layer of low refractive index material, the optical thickness of each layer other than the outer pair of layers being $\lambda/4$, the optical thickness of each layer of the outer pair of layers being deviated from $\lambda/4$, and the total optical thickness of the layers of the outer pair of layers being $\lambda/2$.

9. An excimer laser apparatus in accordance with claim 8, wherein
said optical thickness of said layer of low refractive index material of said outer pair of layers is thicker than that of said layer of high refractive index material of said outer pair of layers.

10. An excimer laser apparatus comprising:
a pair of longitudinally extending bar-shaped main discharge electrodes enclosed in a chamber in a spaced parallel relationship relative one another and defining a gap therebetween having a longitudinally directed laser axis therein,
a plurality of pre-discharge electrodes in said chamber extending along and adjacent to the gap defined between said pair of main discharge electrodes,
a laser gas including an excimer laser active medium enclosed in said chamber,
a total reflector positioned in proximity to one end of said pair of main discharge electrodes for reflecting energy along the laser axis, said total reflector being composed of of an aluminum layer, dielectric multilayers and a single crystal plate made of a material selected from the group consisting of calcium flouride and magnesium flouride on a substrate made of a material having a high thermal conductivity and a low coefficient of linear expansion, and
an output coupling reflector positioned in proximity to the other end of said pair of main discharge electrodes and facing said first-mentioned end for reflecting energy along the laser axis,
wherein said dielectric multilayers are composed of at least two pairs of a layer of high refractive index material and a layer of low refractive index material, the optical thickness of each layer other than the outer pair of layers being $\lambda/4$, the optical thickness of each layer of the outer pair of layers being deviated from $\lambda/4$, and the total optical thickness of the layers of the outer pair of layers being $\lambda/2$.

11. An excimer laser apparatus in accordance with claim 10, wherein
said optical thickness of said layer of low refractive index material of said outer pair of layers is thicker than that of said layer of high refractive index material of said outer pair of layers.

12. A reflector for an excimer laser comprising:
a substrate having a precisely polished surface,
an aluminium layer formed on said surface of said substrate,
dielectric multilayers formed on said aluminium layer, and
a protecting plate made of a single crystal plate of material selected from the group consisting of calcium flouride and magnesium flouride, and formed on said dielectric multilayers,
wherein said dielectric multilayers are composed of at least two pairs of a layer of high refractive index material and a layer of low refractive index material, an optical thickness of each layer other than the outer pair of layers is $\lambda/4$, and an optical thickness of each layer of the outer pair of layers is deviated from $\lambda/4$ and the total optical thickness of the layers of the outer pair of layers is $\lambda/2$.

* * * * *